United States Patent Office 2,991,256
Patented July 4, 1961

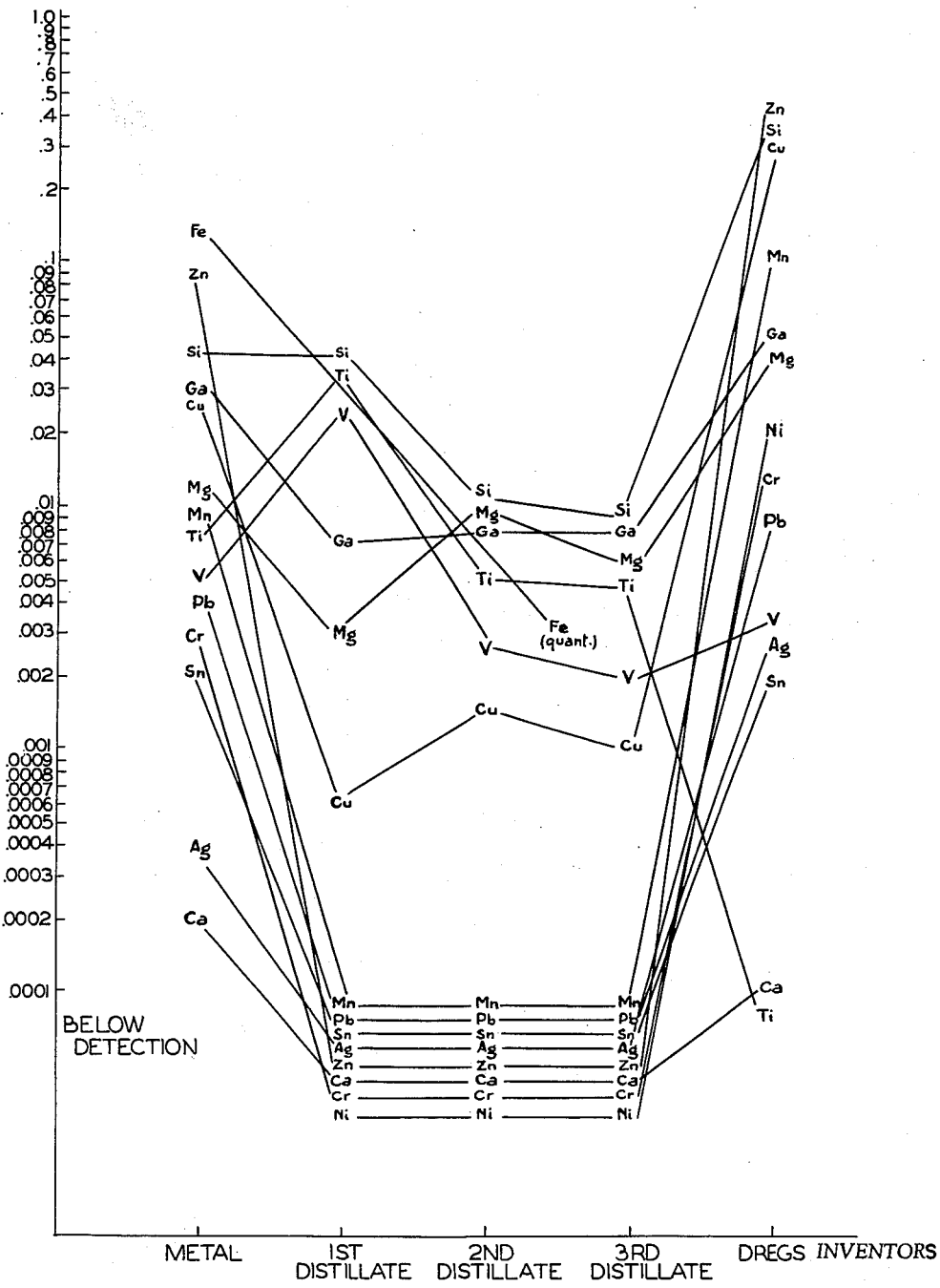

2,991,256
CATALYST MANUFACTURE
Anna P. Hauel, West Orange, and John H. Koch, Jr., Nutley, N.J., assignors, by mesne assignments, to Engelhard Industries, Inc., Newark, N.J., a corporation of Delaware
Filed July 14, 1955, Ser. No. 521,989
17 Claims. (Cl. 252—466)

This invention relates to a new process for the production of alumina-supported catalysts, the alumina in which is derived by the calcination of alumina hydrate, wherein essential requirements are high trihydrate concentration in the alumina hydrate precursor of the alumina and high degree of freedom from unwanted elements in the final catalyst; and it includes not only the process of producing the supported catalyst but improvements in the production of the alumina hydrate of high trihydrate content and high degree of freedom from unwanted elements.

In certain catalytic processes, for example, catalytic reforming or hydroforming of light hydrocarbon stocks to produce high octane gasoline, benzene and such aromatics as toluene and the xylenes, important advantages from the standpoint of catalyst life and regenerability accrue if the catalyst, for example, platinum, rhodium, palladium, or iridium, usually and advantageously platinum, supported on alumina, is made with an alumina support which is produced by the calcination of a hydrous alumina predominantly crystalline trihydrate, that is, gibbsite, randomite or bayerite, or any of their combinations, low in intrinsic impurities, particularly heavy metals and alkali metals, present because present in the starting reagents, as distinguished from extrinsic impurities, such as iron picked up during processing (tramp iron). It has been found that the mechanical properties such as crushing strength and attrition resistance of such catalyst are increased if a minor proportion of the precursor alumina hydrate is in the form of amorphous hydrated alumina or in a form corresponding after drying to the monohydrate, e.g. boehmite, or is a mixture of these forms. Such catalysts are characterized by a large surface area, ranging from about 350 to about 550, usually something over 400, square meters per gram as determined by the BET method. They are also characterized by a relatively large content of pore volume in the pore size range of about 100 to 1000 Angstrom units, of the order of 0.2 to 0.5 cc. per gram of pore volume in pores of this size, although the mechanical steps of forming the catalyst into pellets, as by pelleting or extrusion, affects the amount of pore volume of pores of this large size and it appears that, particularly if the final catalyst be in the form of small pellets, e.g. 1/16 inch pellets, the pore volume in large pores can be considerably below 0.2 cc. per gram, e.g. 0.15 cc. per gram or less, without destroying activity, life or regenerability of the catalyst unduly. The crystallite size of the precursor alumina trihydrate is usually in the 100 to 1000 Angstrom unit range, although where the hydrous alumina is largely bayerite, the crystallite size is frequently substantially greater than this. In the calcined product the alumina hydrate has been converted to gamma alumina modifications. The trihydrate herein termed "bayerite" is sometimes referred to as "beta-trihydrate" and that termed "gibbsite" is sometimes referred to as "alpha-trihydrate" and sometimes as "hydrargillite." That termed "randomite" is a third phase which appears to be intermediate between the other two. When bayerite or randomite is present in the alumina hydrate, eta-alumina is the calcined catalyst.

Production of catalysts of this type, and a description of the X-ray and other techniques used for determining the various values are described in application Serial No. 288,058, filed May 15, 1952, now abandoned, and U.S. Patent 2,838,444. The process illustrated in the examples of those applications for the production of catalysts, particularly platinum catalysts for reforming, of this type involves reaction of aluminum chloride with ammonia, with production of an alumina hydrate hydrogel which by aging, or by seeding, is converted to alumina hydrate in which the phases are predominantly trihydrate. The hydrogel is purified by repeated washing and filtration, to remove electrolytes and any other impurities which can be so removed. We have found that to make the most effective catalysts by this procedure it is necessary to use highly purified aluminum chloride, and from pilot plant work which we have observed, we have found it necessary to prepare the aluminum chloride from highly purified aluminum, as we have not found it possible to remove contaminating metals from the aluminum hydrate by washing or other procedures if they were present in the aluminum chloride or in the aluminum from which the aluminum chloride was prepared. Thus, we have found that the ordinary virgin aluminum of commerce, for example, 2S aluminum of the Aluminum Company of America, results in a product containing too high a proportion of intrinsic impurities, and we have not found any way to adequately remove them.

Production of a platinum catalyst by this process is, therefore, quite expensive, in view of the requirements as to purity of starting material, requirements for the use of glass-lined or equivalent equipment in certain stages to prevent contamination and the requirement for repeated washing and filtration of the hydrate to remove electrolytes. Furthermore, it is difficult to control the relative proportions of gibbsite, randomite and bayerite in the trihydrate component of the alumina hydrate. Seeding, while of some help, does not really solve the problem in this procedure because, with this process, seeding tends to produce a trihydrate component with a high bayerite content; the bayerite content does not parallel that of the seed, and seeding leads to material in which bayerite predominates. Production of batches with high gibbsite or randomite content by aging, as distinguished from seeding, requires extensive aging, and in a plant presents problems because of the possibility of seeding resulting from the presence on equipment of residue from previous batches, difficult, if not impossible, to remove completely.

In one form the process of the present invention provides improvements by which alumina catalyst bases of the type described in application Serial No. 288,058 and the aforesaid U.S. Patent 2,838,444, of the desired physical characteristics accruing from the use of the hydrous alumina predominantly crystalline trihydrate, including high surface area, and large volume of large pores, with high intrinsic purity, are obtainable at substantially reduced cost. The improvements substantially eliminate the need for expensive washing and filtering steps heretofore required; eliminate the need for the heretofore required glass-lined or equivalent equipment; reduce reagent costs substantially (the HCl used heretofore is not recoverable, whereas the reagent, a lower aliphatic alcohol, used in the present process is) permit the use of ordinary, as distinguished from extremely pure aluminum; and provide better control of the phase distribution of the trihydrate content of the alumina hydrate as between bayerite, randomite and gibbsite, with faster aging of the alumina hydrate to the desired high trihydrate content if seeding be the technique used.

In accordance with this aspect of the present invention, hydrous alumina, predominantly trihydrate, is prepared by converting aluminum to a stable alcoholate of a lower aliphatic alcohol of 2 to 8 carbon atoms, advantageously a water-soluble or water-miscible alcohol, preferably isopropyl alcohol; distilling the alcoholate, eliminating the forerun and a residue; hydrolyzing the alcoholate at a temperature not exceeding about 85° C.; and inducing the presence of a predominant proportion of trihydrate in the resulting hydrolysate by seeding, aging, addition of ammonia, or a combination thereof.

In another aspect the present invention relates to the preparation of the catalyst base by use of aluminum alcoholate prepared from the $C_2$ to $C_8$ alcohol and either pure aluminum or ordinary aluminum with advantages being afforded in the formation of the trihydrate phase and in the ultimate catalyst properties. These results are obtained when the alcohol released during hydrolysis is substantially removed from the hydrate phase prior to aging. Thus the alcoholate is hydrolyzed at temperatures of up to about 85° C., and preferably from about 40 to about 85° C., and the alcohol then substantially removed as by filtration and preferably as by filtration and water washing. The conversion to trihydrate is then effected to obtain the catalyst base precursor and the final catalyst as according to the procedures noted herein.

In general the removal of the alcohol before aging facilitates conversion of the alumina hydrate phase to higher proportions of trihydrate, e.g. above about 75% and preferably from about 75 to about 85%, particularly when ammonia is not employed during aging. Also, the properties of the reforming catalysts produced from the precursor aged in the substantial absence of alcohol are improved. Although it is preferred to use virgin aluminum of commerce in preparing the alcoholate with discard through distillation of a forerun and residue, the purer forms of aluminum can be employed in making the alcoholate. In such case when desired the alcoholate can be distilled with the discard of the forerun and residue; however, the aluminum could be sufficiently pure to avoid the necessity of the distillation. Economically the use of the purer aluminum forms may be unattractive or prohibitive.

We have found that in the conversion of the alumina hydrate to trihydrate as carried out particularly by aging, seeding or their combination, the phase distribution as between the three trihydrates is influenced by the temperature at hydrolysis, high temperatures, e.g. about 40 to about 85° C., giving a trihydrate distribution consisting of substantial proportions of the three phases, gibbsite, randomite and bayerite with low temperatures, e.g. below about 40° C., giving a high bayerite content. The rate at which aging to high trihydrate content occurs is influenced by the temperature, being faster at high temperatures, e.g. about 50 to about 85° C., than at low temperatures, e.g. room temperatures; and by the pH of the menstruum, being low or not occurring below pH 7.5, slow from pH 7.5 to pH 9.0, and rapid from pH 10 to 11. Excessive temperatures, e.g. 90 to 95° C., lead to boehmite.

Conversion by seeding proceeds rapidly. In particular, hydrolysis in the presence of the seed favors rapid conversion to trihydrate. When seeding is used, the trihydrate obtained, as a generality, contains a larger proportion of bayerite than does the seed. This shift is minimized by hydrolysis at high temperatures and use of a seed containing a large proportion of gibbsite and little bayerite.

It should be noted that ultimate analysis of the final product does not necessarily lead to values which indicate that the alumina hydrate has or has not the necessary intrinsic purity. For example, we have found that for a good platinum reforming catalyst, the amount of iron present as an intrinsic impurity should be very low, for example well below 0.1%, and advantageously of the order of a fraction of 0.01%. On the other hand, during the processing of the material, as for example, drying of the hydrate on drum driers, extrusion, pelleting or the like, the catalyst may easily pick up considerably more iron as an extrinsic impurity than can be tolerated as an intrinsic impurity. Ultimate analyses of the final product to do not distinguish between the two types of iron.

In evaluating these catalysts, for example, a platinum reforming catalyst, it must be borne in mind that what appear to be small differences in process results may in fact be of controlling economic importance. Thus, with a 15,000 barrel per day plant for the production of a reformate of specified octane number from a given naphtha, a 1% difference in yield is about 150 barrels per day of the reformate. If one assumes that a platinum catalyst costs $5.00 per pound exclusive of platinum cost, and has a life of 50 barrels of reformate per pound (both arbitrary assumptions), a 1% increase in yield is almost equal to the catalyst cost which is very substantial in that in a fixed bed unit catalyst charge is about 5 pounds per daily barrel of reformate. Small differences, percentage-wise, in product yield or octane improvement, thus become, for catalysts of this type, economically controlling.

In carrying out the hydrolysis of the aluminum alkoxide to produce the aluminum hydrate, several precautions are important. First, the water used should be of high purity, preferably distilled or deionized, to minimize introduction of impurities. Secondly, the reaction should be carried out with careful control of temperature. The reaction is strongly exothermic, and the hydrate when produced tends to gel or thicken. Accordingly, the alkoxide is usually added to the water with appropriate cooling, and with vigorous agitation, or flowing streams of the two are brought together with appropriate intimate and immediate admixture. Addition of water to the aluminum alkoxide presents difficulties as a result of thickening and local overheating. It is advantageous to disperse trihydrate seed in the water to which the alcoholate is added, as will be illustrated by certain examples, but appropriate control of trihydrate content and phase distribution can be obtained without seeding, as will be illustrated by other examples. If the alcoholate used has a relatively large chlorine content present, for example, from the catalyst used in the aluminum-alcohol reaction, hydrolysis may lead to an acid hydrolysate, and in such case it is sometimes desirable to include a little ammonia in the hydrolysis water, to raise the pH to a level at which trihydrate formation occurs very slowly, to produce a high gibbsite, low bayerite trihydrate.

Where a hydrate so formed, after establishment of the proper phase pattern, for example, from about 65 to 95 weight percent total trihydrate, with the remainder either the boehmite form or amorphous, is to be used in forming the base for a platinum catalyst, the platinum is simply incorporated in the slurry as, for example, by adding the appropriate quantity of chloroplatinic acid and precipitating with hydrogen sulfide, and the slurry dried by evaporation, as, for example, on a drum drier, formed into tablets or pills, and calcined. Where the platinum catalyst is intended for reforming, it appears to be important to have the platinum so finely dispersed that there is no evidence of the presence of platinum crystallites of size greater than about 50 Angstrom units as determined by X-ray technique. We have found that in situ precipitation of the platinum in the hydrate slurry is conducive to such platinum distribution in the final catalyst, although we believe that the platinum can be incorporated in the hydrate after drying, low temperature calcination and reslurrying if the proper precautions are observed.

The aluminum alkoxide, advantageously the isopropoxide, used in the process of the invention is readily prepared by direct reaction of the anhydrous alcohol with metallic aluminum. The reaction is exothermic and proceeds in the presence of a catalyst such as carbon tetrachloride or mercuric chloride, usually under refluxing conditions. The reaction proceeds the more rapidly the more finely divided the aluminum is. Aluminum in the form of small pieces or granules is satisfactory. If carbon tetrachloride is used, considerable chlorine remains in the alcoholate which is apparently not removed during distillation. If mercuric chloride is used, the amount of residual chlorine is much less. The mercury is apparently completely removed, as it is not even spectrographically determinable in the distilled alcoholate.

Distillation of the aluminum alcoholate is simple. This distillation provides a middle fraction, which may in general be up to about 96 weight percent of the original alcoholate when the alcoholate is prepared from virgin aluminum of commerce. In the distillation excess alcohol is first removed and the alcoholate then purified by rectification. Fractional distillation improves the efficiency of the operation. Discard of a forerun of at least about 2 weight percent and a residue of at least about 2 weight percent (both based upon total alcoholate) is adequate to produce a product of high purity from ordinary virgin aluminum of commerce, as distinguished from highly purified grades which are available at high prices. Titanium and vanadium appear to concentrate in the forerun and other metals, except perhaps magnesium, in the residue. In one operation an aluminum (2S grade) was converted to the isopropoxide, with mercuric chloride as the catalyst, excess isopropyl alcohol was removed by evaporation and the isopropoxide distilled, using a Claisen head. The metal and the fractions collected were subjected to spectrographic analysis. The fractions, as shown graphically in the appended drawing, consisted of first distillate 7%, second distillate 37%, third distillate 45%, and undistilled residue as the 11% balance (expressed on an aluminum isopropoxide basis). The residue contained about 2.5% reacted dregs (which was subjected to spectrographic analysis) and a remainder of unreacted aluminum. The very favorable purification of commercial aluminum by this procedure is evident.

In the following examples illustrations are given of the production of aluminum alcoholates, of the conversion of aluminum alcoholates to alumina hydrates, and the establishment in the hydrates of a phase distribution predominantly trihydrate with various relative proportions of gibbsite, randomite and bayerite by both aging and seeding techniques, and the production of platinum reforming catalysts, but the invention is not limited thereto.

Example I 350 grams of aluminum pieces (2S; $\frac{1}{32} \times \frac{1}{4} \times \frac{1}{4}$ inches), 3500 cc. of dry isopropanol (C & C 99%), and 50 mg. of mercuric chloride were placed in a 5-liter flask and refluxed on a hot water bath. Gas evolution as measured by the wet meter was about 120 liters per hour initially and fell to about 60 liters per hour in about $\frac{1}{2}$ hour. An additional 10 mg. of mercuric chloride was added raising the gas evolution to about 100 liters per hour. The reaction was continued with periodic additions of about 10 mg. of mercuric chloride until the calculated amount of hydrogen was evolved, allowing for isopropyl alcohol vapor. The mercuric chloride was added as an isopropyl alcohol solution. The flask was transferred to a heating mantle, a Claisen head put on it and the excess isopropanol was distilled off. When the temperature began to rise, vacuum distillation was begun. The fractions were collected as shown in the drawing, having the analyses indicated thereupon.

Example II

Following the procedure of Example I, 325 grams of 2S aluminum was reacted with dry isopropyl alcohol, using 3350 cc. of the latter and in addition to about 150 mg. of mercuric chloride, 50 cc. of carbon tetrachloride. On fractionation (128–135° C./6–8 mm.) a middle fraction totaling 1981 grams was obtained. The forerun totaled 127 grams and the residue was 60 grams.

Example III 325 grams of very pure aluminum was converted to the isopropoxide by the procedure of Example I, using 3500 cc. of dry isopropyl alcohol and about 150 mg. of mercuric chloride. Distillation (120–145° C./3–13 mm.) gave 2139 grams of a highly purified middle fraction. The forerun totaled 130 grams and the residue was 78 grams.

Example IV 50 grams of 2S aluminum were converted to the isopropoxide by the procedure of Example I, using 500 cc. of isopropyl alcohol, together with both carbon tetrachloride and mercuric chloride as catalysts. Distillation of the aluminum isopropoxide was carried out at about 10 mm. pressure and 145 to 153° C. temperature. About 95 grams of the liquid aluminum isopropoxide so formed were supercooled to room temperature. They were added to 350 cc. of distilled water in about five minutes with vigorous agitation. Initial temperature was 25° C. and sufficient cracked ice was used during the addition to prevent the temperature going over 30° C. The pH of the hydrolysate was 4.6, due to a large amount of chloride distilled over with the aluminum isopropoxide. The hydrolysate was separated into portions after adjusting the pH to 7.9 by adding aqueous ammonia.

2.5 liters of 28% ammonia per kilogram of $Al_2O_3$ content was added to one portion raising its pH to 10.2. After one day its trihydrate content was 29%; after 5 days 45%; after 11 days 49%; after 18 days 64%, of which 31% was bayerite, 21% randomite and 12% gibbsite. Determinations of trihydrate content in this and in other examples is based on X-ray diffraction analysis of the dried slurries, as described in application Serial No. 288,058 and cannot be regarded as precise figures. Thus, in some cases such analyses indicate the trihydrate content of a given alumina hydrate to exceed 100% despite the fact that the presence of boehmite in the product can be demonstrated. However, there is no more satisfactory means of determining the phase distribution in the trihydrates of which we are aware. It should also be noted that these analyses are based upon X-ray diffraction patterns of the dried hydrates. Aging and change of the phase distribution in the hydrates does not occur after drying as such changes take place only in the slurries or wet filter cakes.

A second portion was filtered, washed and reslurried. 2.5 liters of 28% ammonia per kilogram of $Al_2O_3$ was added raising the pH to 10.7. After one day its trihydrate content was 58%; after 5 days 70%, 55% bayerite and 15% randomite plus gibbsite; after 11 days, total trihydrate was still 70% with about the same phase distribution; after 18 days, trihydrate content was 75%, 53% bayerite and 11% each of randomite and gibbsite.

The third portion was filtered and reslurried and allowed to stand 4 days after which the pH had dropped to 6.7, when the same proportion of ammonia was added. After 11 days, the trihydrate content was 82%, 25% bayerite, 25% randomite and 32% gibbsite; and after 18 days, the trihydrate content was 80% with about the same distribution. The gibbsite content of this trihydrate is high, at a level which we have found difficult to obtain by other procedures for the production of high purity alumina hydrates.

Example V 1.4 kg. of 2S aluminum were reacted with 13 liters of 99% isopropyl alcohol (C+C), with 380 mg. $HgCl_2$ dissolved in isopropyl alcohol added in successive portions as a catalyst. The excess isopropyl alcohol was distilled off and distillation continued under pressure of 5 to 20 mm. and temperature of 141 to 164° C. A forerun of 0.33 kg. was removed, and a distilled product of 9.2 kg. was collected, leaving dregs amounting to 0.75 kg. The distilled aluminum isopropoxide was supercooled to room temperature. A portion was added to distilled water over about 15 minutes with vigorous agitation, sufficient cracked distilled water ice being added during this period to prevent the temperature going over 30° C. The hydrolysate pH was 8.6 and the resulting slurry was equivalent to about 6% Al$_2$O$_3$.

To a portion of the slurry were added two liters of 28% alumina per kilogram of Al$_2$O$_3$. After one day the trihydrate content was 48% and after 3 days was 64%, 22% bayerite, 21% randomite and 11% gibbsite. To another portion was added 5% of an aluminum hydrate seed with a high bayerite content. After one day, the trihydrate content was 40%, and after 3 days 52%, 33% bayerite, 10% randomite and 9% gibbsite.

A similar preparation was made except that the 5% seed high in bayerite was dispersed in the water to which the aluminum isopropoxide was added. After one day the trihydrate content was 72% and after 3 days 79%, substantially all bayerite.

*Example VI*

A series of hydrates were prepared using a distilled aluminum isopropoxide as in the preceding example, but with addition of the aluminum isopropoxide to distilled water containing 5% of aluminum hydrate seed, the temperature being maintained at about 30° C. during the addition of the aluminum alkoxide. When 5% of a seed high in bayerite was used, the hydrate after one day contained 70 to 80% trihydrate, nearly all bayerite. At the end of 3 days the trihydrate content was slightly greater. With a seed containing 16% boehmite, 9% bayerite, 22% randomite and 36% gibbsite, a hydrate was obtained at the end of one day having 42% bayerite, 16% randomite and 38% gibbsite. At the end of 3 days it contained 45% bayerite, 15% randomite, 41% gibbsite and 16% boehmite. (It will be noted that here the composition, as determined by the X-ray diffraction patterns, is indicated to be in excess of 100%.) The product just described was used as seed (5%) for another hydrolysis carried out in the same way except at a temperature of 50° C. followed by aging at 50° C. In four hours, the trihydrate content was 33%, in one day 42%, and in four days 46%, 32% bayerite and 14% randomite and gibbsite.

*Example VII*

2S grade aluminum was converted to the isopropoxide by the procedure of Example I, using mercuric chloride as a catalyst. The product was separated into three batches of the following weights:

| Batch No. | Kgs. of Product | | Dregs |
|---|---|---|---|
| | 1st Distillate | 2nd Distillate | |
| 1 | .06 | 2.2 | .09 |
| 2 | .11 | 2.2 | .10 |
| 3 | .18 | 9.4 | .3 |

The 2nd distillate fractions of batches Nos. 1 and 2 were supercooled and blended together and added, over about a 15-minute period, to distilled water (which was being stirred) at a controlled temperature of 45 to 50° C. The hydrolysate pH was 9.5, which was then adjusted to pH 11.6 by the addition of 2 liters of 28% NH$_3$ per kg. of Al$_2$O$_3$ present. Percent Fe was 0.003% on an Al$_2$O$_3$ basis. The 2nd distillate fraction of batch No. 3 was supercooled to room temperature and added over about a 15-minute period to distilled water (which was being stirred) at a controlled temperature of 25 to 30° C. The hydrolysate pH was 8.8, which was then adjusted to 11.4 by the addition of 2 liters of 28% NH$_3$ per kg. of Al$_2$O$_3$ present. Percent Fe was 0.005% on an Al$_2$O$_3$ basis. After 7 days aging as a slurry at room temperature, the base hydrolyzed at 45 to 50 °C. contained 51% boehmite, 13% bayerite, 29% randomite and 8% gibbsite. After 21 days aging, the total trihydrate was 72%, consisting of 17% bayerite, 44% randomite and 11% gibbsite. By contrast, the base hydrolyzed at 25 to 30° C. contained 54% trihydrate after 1 day and 79% after 7 days, which was distributed between 60% bayerite, 13% randomite and 6% gibbsite. The marked effect of hydrolysis temperature on rate of aging to trihydrate and on bayerite percent of total trihydrate is apparent.

*Example VIII*

Pure aluminum was converted to the isopropoxide by the procedure of Example I, using mercuric chloride as a catalyst, in two batches yielding the following weights of product:

| Batch No. | Kgs. of Product | | Dregs |
|---|---|---|---|
| | 1st Distillate | 2nd Distillate | |
| 1 | .31 | 8.29 | .33 |
| 2 | .27 | 9.90 | .27 |

The combined 2nd distillate portions of batches Nos. 1 and 2 were supercooled to room temperature and added over about a 15-minute period to distilled water (which was being stirred) at a temperature controlled between 41 and 45° C. Hydrolysate pH was 8.4, and impurities found present were 0.001% Fe and less than 0.01% Cl, on an Al$_2$O$_3$ basis. One portion of the slurry was aged at room temperature and after 12 days contained 15% bayerite and 29% randomite and gibbsite. Another portion of the slurry was aged at 70 to 75° C., and after 9 days contained 21% bayerite and 53% randomite and gibbsite. These results show the effect of heat on the aging time in the absence of seeding or ammonia addition.

*Example IX*

A quantity of Kodak commercial aluminum ethoxide was melted at 275° C. A small portion of hydrolyzed alumina settled to the bottom of the jar and was removed. Portions of the liquid were supercooled and added to three times their weight of water, as follows:

A first portion A was added at 30° C. to the water containing 2 liters of NH$_4$OH per kg. of anticipated Al$_2$O$_3$. This slurry produced 83% trihydrate in 5 days, consisting of 61% bayerite and 22% randomite and gibbsite. A second portion B was added to the water containing a high gibbsite seed (5% on an Al$_2$O$_3$ basis) producing in 5 days 59% trihydrate, consisting of 35% bayerite and 24% randomite and gibbsite. A third portion C was added to the water containing 5% (on an Al$_2$O$_3$ basis) of a bayerite seed. In 5 days the trihydrate content of the slurry was 71%, which was entirely bayerite.

From the foregoing examples the following facts, among others, appear:

(1) Aging to high trihydrate content takes place more rapidly at relatively high pH values, e.g. about 11.

(2) Conversion to trihydrate is accelerated by seeding, addition of ammonia or heating to temperatures above room temperature but not above about 80 to 85° C.

(3) To produce a trihydrate relatively high in gibbsite, aging should be initiated at low pH values, or the hydrolysis should take place in the presence of a seed containing a high proportion of gibbsite.

(4) Relatively high temperatures, i.e. about 40 to 85° C. during hydrolysis favor high gibbsite and randomite content with the formation of bayerite being favored at hydrolysis temperatures below about 40° C.

Reforming catalysts can be prepared from alumina hydrates with relatively high trihydrate content, e.g. from about 65 to 95%, irrespective of the phase distribution of the trihydrate as between bayerite, randomite and gibbsite. These catalysts contain as a component part of the base about 5 to 35 weight percent of the amorphous hydrated alumina or the boehmite form or their mixture, which component can be provided by control of hydrate aging or by separate addition. In general, we prefer to prepare such catalysts from alumina hydrates containing substantial proportions of each of the three trihydrate phases.

We have pointed out above that for a platinum reforming catalyst, it appears to be important to have the platinum distributed in such finely divided form that it shows no platinum metal response on X-ray diffraction analysis, that is, in such a way that the platinum present, if it is present as a metal, is in the form of crystallites or particles of a size less than 50 Angstrom units. We do not know whether the presence of some platinum in larger crystallite size than this is actually detrimental or whether it merely represents a waste of platinum, but the superior catalysts which we have prepared have exhibited an absence of platinum of such large crystallite size.

We have found that the distribution of platinum in the catalyst in respect of particle size as indicated by X-ray diffraction technique is influenced by the pH, and probably the electrolyte content of the alumina hydrate slurry in which the platinum is dispersed in situ. Thus, while we have found that it frequently accelerates aging of the hydrate to the desired phase pattern by having the hydrate at a pH of 10 or 11, as by the inclusion of some ammonia in the slurry, we have found that to avoid the presence of large platinum crystallites in the final product it is important to reduce the pH below about 9, either by filtering and reslurrying or by heating the slurry to around 90° C. to remove a substantial proportion of the ammonia. We have not found that the same results can be obtained by adjusting the pH as, for example, by the addition of acetic acid or carbon dioxide, perhaps because of the resultant high electrolyte content. The usual method of dispersing the platinum, that is addition of chloroplatinic acid to the slurry followed by precipitation with hydrogen sulfide, substantially reduces the pH of the slurry, usually to the acid side. It is low electrolyte content of the slurry itself, before the addition of the chloroplatinic acid, which we think is important in obtaining proper platinum dispersion. We have found that the presence of isopropyl alcohol resulting from the hydrolysis does not interfere with the proper precipitation of the platinum.

The following example illustrates the preparation of a platinum reforming catalyst in accordance with the invention:

*Example X*

Pure aluminum was converted to the isopropoxide by the procedure of Example I, using mercuric chloride as a catalyst, in three batches yielding the following weights of product:

| Batch No. | Kgs. of Product | | Dregs |
|---|---|---|---|
| | 1st Distillate | 2nd Distillate | |
| 1 | 0.26 | 9.8 | 0.41 |
| 2 | 0.30 | 9.4 | 0.28 |
| 3 | 0.28 | 9.45 | 0.43 |

The second distillates of the first two batches were supercooled to room temperature and added together over about 15 minutes to vigorously agitated distilled water at a temperature between 55° and 63° C. The third batch of aluminum isopropoxide was similarly hydrolyzed at a temperature between 40° and 50° C. In both cases the water had present as a seed 1.7% based on the $Al_2O_3$ produced, of an alumina hydrate having 4% boehmite, 12% bayerite, 25% randomite and 68% gibbsite. At the end of the fifth day with aging at room temperature, the first slurry contained 38% boehmite, 43% bayerite, 8% randomite and 20% gibbsite, while the second slurry after four days contained 14% boehmite, 72% bayerite and 12% gibbsite. The first slurry contained 0.01% Cl and 0.001% Fe; the second 0.02% Cl and 0.001% Fe. The two were blended after 7 days for the first slurry and 6 days for the second, and to the mixture aqueous chloroplatinic acid in amount equivalent to 0.6% platinum on an aluminum oxide basis was added with agitation. The platinum was precipitated by the slow addition of 2.5 equivalents of aqueous $H_2S$, with vigorous agitation, and the mass was drum-dried and extruded as 1/16 inch pellets. It was then calcined in diluted oxygen, ending with flowing air at 900° F. for 6 hours. This catalyst was designated No. 516-Res. 38A.

The seed used in the foregoing example was obtained by hydrolyzing an aluminum isopropoxide produced from pure aluminum and dry isopropyl alcohol with carbon tetrachloride and mercuric chloride as the catalyst. The pH after hydrolysis was 5.3. It was adjusted by the addition of ammonia to 7.9. During aging the pH dropped to 5.6 and 1.1 liters of 28% ammonia per kilogram of $Al_2O_3$ was added on the 59th day, at which time it contained 18% boehmite, 5% bayerite, 10% randomite and 28% gibbsite. On the 66th day, the hydrate contained 12% bayerite, 25% randomite and 68% gibbsite. The product had a high chlorine content, about 8% based on the $Al_2O_3$, probably reflecting inclusion of chlorine in the product from the carbon tetrachloride used in the reaction between the aluminum and the isopropyl alcohol. It was filtered and washed to reduce the electrolyte content to a low level, and then used as the seed.

*Example XI*

First, aluminum isopropoxide was prepared by dissolving 60 kg. of pure aluminum in 60 liters of 99% isopropanol. In order to facilitate the reaction, 6 kg. of aluminum isopropoxide was added to the reagents to absorb traces of moisture, and a trace of mercuric chloride was added to serve as a catalyst. The mixture of the reagents was heated to 82° C. When all of the metal was dissolved, the excessive isopropanol was distilled off, and the remaining aluminum-isopropoxide was purified by a vacuum distillation under 7 mm. Hg at about 150° C. The thus purified material was hydrolyzed to alumina and isopropanol with pure water. A hydrolysis technique was applied which rapidly carried away every fraction of hydrolyzed material from the zone where hydrolysis took place in order to prevent seeding in the hydrolysis zone. The liquid reagents were fed simultaneously into the inlet of a small colloid mill which mixed them thoroughly and rapidly and discharged the hydrolyzed product immediately into a receiving tank with controlled temperature. Facilities were provided to chill the hydrolysis product rapidly and efficiently between colloid mill outlet and receiving tank. The reagents were hot, fluid aluminum-isopropoxide purified by distillation and deionized water of controlled temperature. The reaction product was a dispersion consisting of aluminum hydroxide in water and the liberated isopropanol. Water was pumped into the mill at a constant rate. The viscous aluminum-isopropoxide was injected with air pressure, also at a constant rate, through an orifice of about 1/16 of an inch. The conditions were:

| | ° C. |
|---|---|
| 15.3 kg. aluminum isopropoxide | 110 |
| 143 liters water | 63 |
| Hydrolysis temperature in the colloid mill | 73 |
| While discharged chilled to | 32 |
| Agitated in the receiving tank for 1 hr. at | 32 |
| Filtered on a rotary type filter with top-wash | |
| Washwater temperature | 28 |

Due to filtering and washing the isopropanol content of the filter cake was reduced to a minimum. The cake consisted of a hydrous gel of alumina. The X-ray diffraction pattern showed mainly amorphous alumina and boehmite, $Al_2O_3 \cdot H_2O$. The cake was aged in a hot chamber 48 to 50° until the aluminum trihydrate content was 47% bayerite, 22% randomite and 16% gibbsite. The aged hydrate also contained 7% boehmite. The aged alumina hydrate was then impregnated with platinum as follows: to a slurry consisting of 1 kg. of $Al_2O_3$ to 10 kg. of water and a trace of isopropanol, 15 g. of chloroplatinic acid were added as an aqueous solution. Thereafter, 1.4 liters of a saturated hydrogen-sulfide solution were added. The slurry was dried on a drum drier at 155° C. to a powder which consisted of $Al_2O_3 \cdot H_2O$, $Al_2O_3 \cdot 3H_2O$, some amorphous Al platinum-sulfide and a trace of chlorine. The extrusion and calcination steps were carried out as described in Example X to prepare catalyst No. 516–1049.

*Example XII*

Catalysts No. 516-Res. 38A and No. 516–1049 described in the foregoing Examples X and XI were contacted under accelerated test conditions with about 38 Research Method Octane (neat) Mid-Continent straight run naphtha typically of 246° to 359° F. ASTM distillation boiling point range and analyzing:

| | Percent |
|---|---|
| Paraffins | 46.7 |
| Olefins | 1 |
| Naphthenes | 44.8 |
| Aromatics | 8.3 |

The reforming operation using this feed stock was conducted in each case for 48 hours at 940° F., 200 p.s.i.g. and 5 moles of gas recycle per mole of hydrocarbon feed. The recycle gas consisted principally of hydrogen with a minor amount of methane being present. The naphtha feed was charged to the reaction vessel at the rate of 15 WHSV (space velocity in weight of hydrocarbon per weight of catalyst per hour). Test results showed catalyst Res. 38A had a relative activity of 89 while catalyst No. 1049 had a relative activity of 97.

In preparing reforming catalysts, other platinum-type metals, than platinum itself, including rhodium, palladium and iridium, may be used in place of platinum, but so far as we are presently aware, the platinum catalysts are more effective as reforming catalysts than are catalysts prepared with other platinum metals. In general, in preparing these platinum catalysts, or catalysts in which a platinum metal other than platinum is used, the amount of such metal will range from about 0.1% to about 1%. There appears to be a gradual increase in activity, as distinguished from selectivity, of a catalyst as the amount of platinum increases, up to about 1.0% or something slightly less, but the difference is not particularly marked as, for example, is shown by the fact that while a catalyst with 0.6% platinum is slightly more active than a catalyst with 0.35% platinum, the question as to which is economically more advantageous is a very close one, depending perhaps on the naphtha treated.

It should also be noted that, if desired, promoters may be included along with the platinum metal, such as fluoride or other acidic promoters. In general, we have found that the inclusion of such promoters tends to interfere with the regeneration of the catalyst and, therefore, think that the use of such promoters is from an overall viewpoint disadvantageous. The catalyst prepared by our process is regenerable even on a commercial basis.

In the example which illustrates the production of a platinum catalyst in accordance with the present invention, the platinum was deposited by precipitation on the alumina hydrate without drying or otherwise treating the hydrolysate except to induce the formation in it of the required high trihydrate content. We have observed that a good catalyst may be prepared from the same or similar alumina hydrate compositions by drying, calcining at a relatively low calcination temperature, e.g. around 300° C., suspending the resulting low temperature calcined product in water, and thereafter incorporating the platinum in the composition.

Except for X-ray diffraction data, unless otherwise indicated when specifying percentages of components of the catalyst composition and of the alumina hydrate, we refer to weight percent on an ignited basis. Also, surface area as mentioned above is calculated on an ignited weight basis.

We claim:

1. The process of preparing alumina hydrate-containing compositions of high intrinsic purity in which the hydrate is predominantly trihydrate which consists essentially of the steps of distilling a distillable alcoholate of aluminum containing intrinsic impurities and a lower aliphatic alcohol of 2 to 8 carbon atoms to obtain a middle distillate fraction of high intrinsic purity and obtaining in said distillation a forerun and a residue each of which is at least about 2% of the alcoholate, hydrolyzing said middle distillate fraction of the alcoholate with water at a temperature not exceeding about 85° C. to form a hydrolysate, and converting the major proportion of the hydrous alumina in such hydrolysate to trihydrate.

2. The process of claim 1 in which the alcoholate is aluminum isopropoxide.

3. The process of claim 1, in which seed crystals of alumina trihydrate are incorporated in the hydrolysate.

4. The process of claim 1 in which the hydrolysis is carried out at a temperature from about 40 to about 85° C., whereby a hydrate with relatively large proportions of gibbsite and randomite is obtained.

5. The process of claim 1 in which the hydrolysis is carried out at a temperature below about 40° C. whereby a hydrate with a relatively large proportion of bayerite is obtained.

6. The process of claim 1 in which the conversion of the hydrolysate is conducted at a temperature of from about 50 to about 85° C.

7. In a process of producing an alumina supported platinum metal catalyst prepared by combining a platinum metal component with the support, said platinum metal component being in finely distributed form to provide reforming activity, the steps consisting essentially of drying and calcining an alumina derived through the procedure of claim 1.

8. The process of claim 1 in which ammonia is incorporated in the hydrolysate.

9. The process of claim 1 in which the hydrolysis is carried out in the presence of ammonia.

10. In a process of producing an alumina supported platinum metal catalyst prepared by combining a platinum metal component with the support, said platinum metal component being in finely distributed form to provide reforming activity, the steps consisting essentially of drying and calcining an alumina derived through the procedure of claim 2.

11. The process of claim 3, in which the hydrolysis is carried out in the presence of seed crystals of alumina trihydrate.

12. The process of claim 7 in which the platinum metal is platinum.

13. The process of claim 9 in which the alcoholate is aluminum isopropoxide.

14. The process of claim 10 in which the platinum metal is platinum.

15. The process of preparing an alumina hydrate containing composition in which the hydrate is predominantly trihydrate which consists essentially of hydrolyzing with water an aluminum alcoholate of a water-miscible lower aliphatic alcohol of 2 to 8 carbon atoms at a temperature not exceeding about 85° C. to form a hydrolysate, removing substantially the alcohol from the hydrolysate, and converting the major proportion of the hydrous alumina in such hydrolysate to trihydrate in the substantial absence of alcohol.

16. In a process of producing an alumina supported platinum metal catalyst prepared by combining a platinum metal component with the support, said platinum metal component being in finely distributed form to provide reforming activity, the steps consisting essentially of drying and calcining an alumina derived through the procedure of claim 15.

17. The process of claim 16 in which the platinum metal is platinum.

References Cited in the file of this patent

UNITED STATES PATENTS

| | | |
|---|---|---|
| 2,499,675 | Owen | Mar. 7, 1950 |
| 2,579,251 | Coates | Dec. 18, 1951 |
| 2,636,865 | Kimberlin | Apr. 28, 1953 |
| 2,656,321 | Hunter et al. | Oct. 20, 1953 |
| 2,749,216 | Dinwiddie et al. | June 5, 1956 |
| 2,796,326 | Kimberlin et al. | June 18, 1957 |

UNITED STATES PATENT OFFICE
CERTIFICATE OF CORRECTION

Patent No. 2,991,256                 July 4, 1961

Anna P. Hauel et al.

It is hereby certified that error appears in the above numbered patent requiring correction and that the said Letters Patent should read as corrected below.

Column 12, line 64, for the claim reference numeral "9" read -- 15 --.

Signed and sealed this 2nd day of January 1962.

(SEAL)
Attest:

ERNEST W. SWIDER
Attesting Officer

DAVID L. LADD
Commissioner of Patents